US012569801B2

(12) United States Patent
Ha et al.

(10) Patent No.: US 12,569,801 B2
(45) Date of Patent: Mar. 10, 2026

(54) CARBON DIOXIDE CAPTURE APPARATUS AND PROCESS COMBINED WITH BIOGAS UPGRADING

(71) Applicant: AIRRANE CO., LTD., Chungcheongbuk-do (KR)

(72) Inventors: Seong Yong Ha, Seoul (KR); Sun Keun Lee, Gyeonggi-do (KR); Kwang Joon Min, Seoul (KR); Chung Seop Lee, Daejeon (KR); Jin Hyuk Yim, Chungcheongbuk-do (KR); Dong Wook Kong, Chungcheongbuk-do (KR); Eunbyeol Baek, Chungcheongbuk-do (KR); Sang Hoon Han, Daejeon (KR)

(73) Assignee: AIRRANE CO., LTD., Chungcheongbuk-do (KR)

( * ) Notice: Subject to any disclaimer, the term of this patent is extended or adjusted under 35 U.S.C. 154(b) by 0 days.

(21) Appl. No.: 18/551,352

(22) PCT Filed: Jun. 28, 2023

(86) PCT No.: PCT/KR2023/009066
§ 371 (c)(1),
(2) Date: Sep. 19, 2023

(87) PCT Pub. No.: WO2024/162536
PCT Pub. Date: Aug. 8, 2024

(65) Prior Publication Data
US 2025/0345742 A1      Nov. 13, 2025

(30) Foreign Application Priority Data

Feb. 1, 2023      (KR) ......................... 10-2023-0013725
Jun. 21, 2023      (KR) ......................... 10-2023-0079682

(51) Int. Cl.
B01D 3/22      (2006.01)
B01D 53/22      (2006.01)
(Continued)

(52) U.S. Cl.
CPC ........... B01D 53/226 (2013.01); B01D 53/72 (2013.01); B01D 71/64 (2013.01); B01D 71/68 (2013.01);
(Continued)

(58) Field of Classification Search
CPC .............................. B01D 53/226; B01D 53/72
See application file for complete search history.

(56) References Cited

U.S. PATENT DOCUMENTS 8,025,715 B2      9/2011   Wijmans
8,585,802 B2 *   11/2013   Keller .................... C10K 1/165
423/220
(Continued)

FOREIGN PATENT DOCUMENTS

JP      2014051427      3/2014
KR      1020160055653      5/2016
(Continued)

*Primary Examiner* — Robert A Hopkins
(74) *Attorney, Agent, or Firm* — DUANE MORRIS LLP; Gregory M. Lefkowitz

(57)      ABSTRACT

The present disclosure relates to a carbon dioxide capture apparatus and process combined with biogas upgrading, and there is provided the carbon dioxide capture apparatus combined with biogas upgrading for simultaneously obtaining high purity methane and carbon dioxide, and improving separation efficiency without an additional process by making use of gas streams after a liquefaction process, and recovering cold heat in the process.

15 Claims, 2 Drawing Sheets

(51) Int. Cl.
    *B01D 53/72*     (2006.01)
    *B01D 71/64*     (2006.01)
    *B01D 71/68*     (2006.01)

(52) U.S. Cl.
    CPC .. *B01D 2053/221* (2013.01); *B01D 2256/245* (2013.01); *B01D 2257/504* (2013.01); *B01D 2311/106* (2013.01); *B01D 2311/2512* (2022.08); *B01D 2311/2698* (2022.08); *B01D 2313/221* (2022.08)

(56)                References Cited

U.S. PATENT DOCUMENTS

| | | | |
|---|---|---|---|
| 10,105,638 B2 * | 10/2018 | Yeo ..................... | B01D 53/226 |
| 2002/0069838 A1 | 6/2002 | Rautenbach | |
| 2017/0283292 A1 | 10/2017 | Kim | |
| 2019/0321780 A1 | 10/2019 | Bikson | |

FOREIGN PATENT DOCUMENTS

| | | |
|---|---|---|
| KR | 10-20170046828 | 5/2017 |
| KR | 1020170137302 | 12/2017 |
| KR | 10-20190114492 | 10/2019 |
| KR | 1020200129647 | 11/2020 |
| KR | 102357385 | 1/2022 |
| KR | 10-2409244 | 6/2022 |

* cited by examiner

CARBON DIOXIDE CAPTURE APPARATUS AND PROCESS COMBINED WITH BIOGAS UPGRADING

CROSS-REFERENCE TO RELATED APPLICATIONS

This application is a § 371 national stage entry of International Application No. PCT/KR2023/009066, filed on Jun. 28, 2023, which claims priority to Korean Patent Application No. 10-2023-0013725 filed on Feb. 1, 2023, and Korean Patent Application No. 10-2023-0079682 filed on Jun. 21, 2023, the entire contents of which are incorporated herein by reference.

TECHNICAL FIELD

The present disclosure relates to a carbon dioxide capture apparatus and process combined with biogas upgrading.

BACKGROUND ART

Biogas refers to a gaseous fuel including methane, carbon dioxide and the like, produced by decomposition of organic waste resources such as sludge, food waste and animal waste by microorganisms, and methane gas free of carbon dioxide and some other gases in the biogas is referred to as biomethane which is recently attracting attention as a source of energy since it can be used as clean fuel like natural gas.

However, the methane content in biogas is at about 50 to 70% level and the heating value (5,000 kcal/m$^3$ or less) is small, so it is difficult to use as the fuel for transportation or manufactured gas, and to increase the heating value to the similar level to natural gas, it is necessary to increase the methane content in biogas up to 95% or more. Accordingly, for use as the fuel for power plants, boilers, factories and vehicles or manufactured gas, it is necessary to facilitate the supply to remote locations through upgrading by the process of separating carbon dioxide/methane mixed gas occupying most of biogas.

A membrane separation process is the method that separates gases by selectively allowing specific substances to pass through using the separation membrane, and gas separation using the separation membrane is based on solution and diffusion and does not involve a phase change, leading to low energy consumption, and requires a small installation area, which makes it easy to maintain and repair. Due to these advantages, it is recently gaining attention as gas separation and purification technology.

Meanwhile, in the past, carbon dioxide obtained as a by-product from biogas was discharged to the atmosphere, but carbon dioxide is the well-known cause of global warming and may cause other environmental issues. Accordingly, there is a need for the development of an apparatus and process for separation and recovery of high purity methane and carbon dioxide.

RELATED LITERATURES

Patent Literature

Patent Literature 1. Korean Patent No. 10-2357385

DISCLOSURE

Technical Problem

The present disclosure is designed to solve the above-described problem, and therefore the present disclosure is directed to providing a carbon dioxide capture apparatus and process combined with biogas upgrading for simultaneously obtaining high purity methane and carbon dioxide, and improving separation efficiency and recovery of methane and carbon dioxide without an additional process by making use of gas streams after a liquefaction process and recovering cold heat in low temperature streams in the process.

Technical Solution

An aspect of the present disclosure provides a carbon dioxide capture apparatus combined with biogas upgrading, including: a first compressor configured to compress a first compressor feed gas including biogas; a first separation membrane configured to separate a first separation membrane feed gas including the gas compressed by the first compressor into a first separation membrane permeate gas and a first separation membrane residual gas; a second separation membrane configured to receive the first separation membrane residual gas and separate into a second separation membrane permeate gas and a second separation membrane residual gas; a third separation membrane configured to receive the first separation membrane permeate gas and separate into a third separation membrane permeate gas and a third separation membrane residual gas; a second compressor configured to compress a second compressor feed gas including the third separation membrane permeate gas; a liquefaction heat exchanger configured to cool down the gas compressed by the second compressor; a carbon dioxide purification unit including a separation tower which is supplied with the gas cooled by the liquefaction heat exchanger, and an upper part in which a carbon dioxide containing gas is obtained and a lower part in which a high purity carbon dioxide liquid is obtained; a first recovery separation membrane configured to receive the carbon dioxide containing gas and separate into a first recovery separation membrane permeate gas and a first recovery separation membrane residual gas; and a first circulation unit configured to circulate the first recovery separation membrane permeate gas to the first separation membrane, the third separation membrane or the second compressor.

Another aspect of the present disclosure provides a carbon dioxide capture process combined with biogas upgrading, including: a first compression step of compressing, by a first compressor, a first compressor feed gas including biogas; a first separation step of feeding the gas compressed by the first compressor into a first separation membrane to separate into a first separation membrane permeate gas and a first separation membrane residual gas; a second separation step of feeding the first separation membrane residual gas into a second separation membrane to separate into a second separation membrane permeate gas and a second separation membrane residual gas; a third separation step of feeding the first separation membrane permeate gas into a third separation membrane to separate into a third separation membrane permeate gas and a third separation membrane residual gas; a second compression step of compressing, by a second compressor, a second compressor feed gas including the third separation membrane permeate gas; a liquefaction step of cooling down, by a liquefaction heat exchanger, the gas compressed by the second compressor; a separation and purification step of feeding the gas cooled by the liquefaction heat exchanger into a separation tower to obtain a carbon dioxide containing gas in an upper part of the separation tower and recover a high purity carbon dioxide liquid in a lower part through a separation and purification process; and a first recovery step of feeding the carbon dioxide containing gas into a first recovery separation membrane to separate into a first recovery separation membrane permeate gas and a first recovery separation membrane residual gas, and circulating the first recovery separation membrane permeate gas to the first separation membrane, the third separation membrane or the second compressor.

Advantageous Effects

The carbon dioxide capture apparatus and process combined with biogas upgrading according to the present disclosure may simultaneously obtain high purity methane and carbon dioxide, and have the improved separation efficiency by making use of gas streams after the liquefaction process for the recovery separation membrane and recovering cold heat in low temperature streams in the process.

BEST MODE

Hereinafter, the present disclosure will be described in more detail with reference to the accompanying drawings and embodiments.

Figure 1:
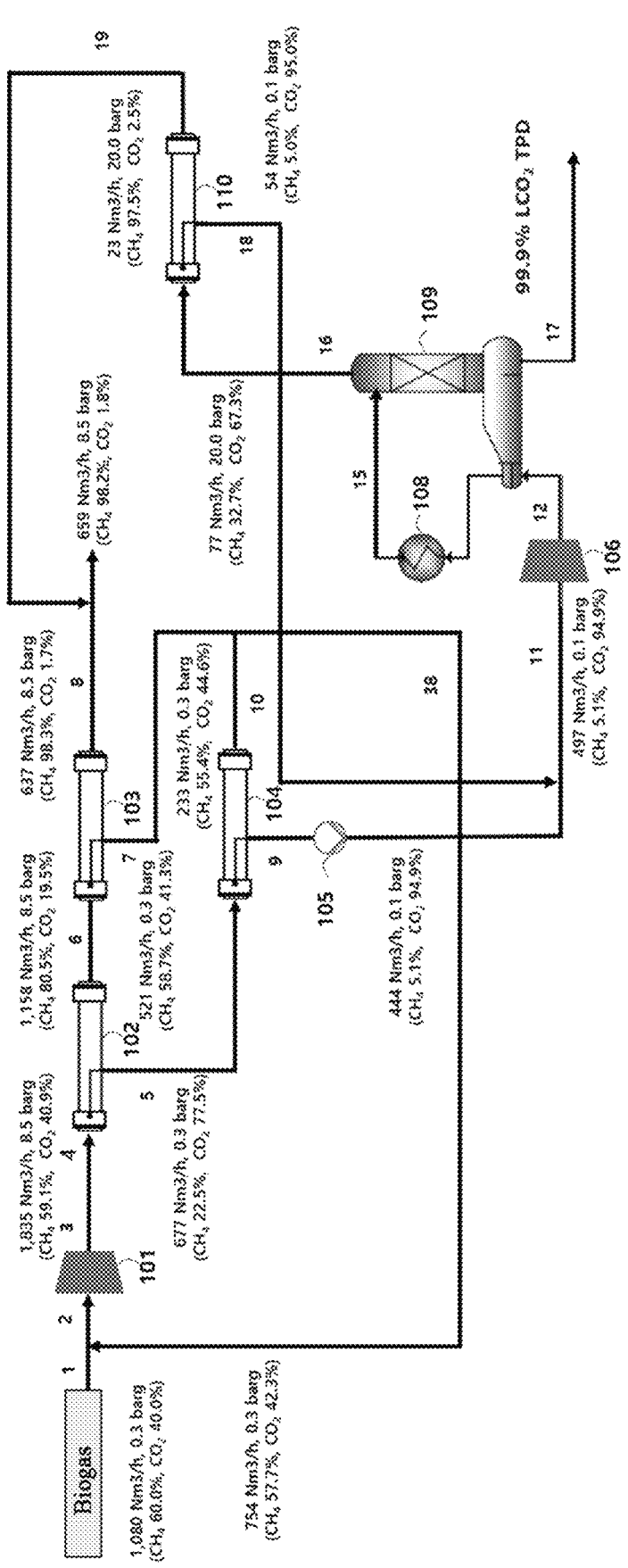
FIG. 1 is a procedure diagram for carbon dioxide capture combined with biogas upgrading according to an embodiment of the present disclosure.

FIG. 1 is a procedure diagram for carbon dioxide capture combined with biogas upgrading according to the present disclosure.

Referring to FIG. 1, a carbon dioxide capture apparatus combined with biogas upgrading according to an aspect of the present disclosure includes a first compressor 101; a first separation membrane 102; a second separation membrane 103; a third separation membrane 104; a second compressor 106; a liquefaction heat exchanger 108; a carbon dioxide purification unit 109; and a first recovery separation membrane 110.

As used herein, biogas is a gas produced by anaerobic digestion of organic waste resources such as sewage sludge, food waste and animal waste by microorganisms, and refers to a gaseous fuel including methane, carbon dioxide and the like.

The first compressor 101 compresses a first compressor feed gas 2.

The first compressor feed gas 2 is a gas including biogas 1, and may be the biogas 1 or a mixed gas of the biogas 1 and at least one gas of a second separation membrane permeate gas 7 or a third separation membrane residual gas 10.

In particular, when the first compressor feed gas 2 is a mixed gas of the biogas 1, the second separation membrane permeate gas 7 and the third separation membrane residual gas 10, it is preferred because the carbon dioxide and methane recovery remarkably improves.

The first compressor 101 may realize a pressure ratio for the separation process of the first separation membrane 102 by compressing the first compressor feed gas 2. More specifically, the first compressor 101 may compress the first compressor feed gas 2 to the pressure of 5 to 20 bar, preferably 6 to 11 bar. In case where the first compressor 101 compresses the first compressor feed gas 2 to the pressure of less than 5 bar, the separation efficiency of the first separation membrane 102 may decrease, and on the contrary, in case where the first compressor 101 compresses the first compressor feed gas 2 to the pressure of more than 20 bar, more energy may be consumed than is needed, resulting in low economic efficiency of the process.

The first separation membrane 102 is supplied with a first separation membrane feed gas 4 including the gas 3 compressed by the first compressor and separates the first separation membrane feed gas 4 into a first separation membrane permeate gas 5 that passes through the first separation membrane 102 and is relatively rich in carbon dioxide and a first separation membrane residual gas 6 that does pass through the first separation membrane 102 and is relatively rich in methane.

The first separation membrane feed gas 4 may be the gas 3 compressed by the first compressor or a mixed gas of the gas 3 compressed by the first compressor and at least one gas of a first recovery separation membrane permeate gas 18 or a second recovery separation membrane permeate gas.

The first separation membrane permeate gas 5 is fed into the third separation membrane 104 for carbon dioxide enrichment and recovery, and the first separation membrane residual gas 6 is fed into the second separation membrane 103 for methane enrichment and recovery.

The second separation membrane 103 is supplied with the first separation membrane residual gas 6, and separates the first separation membrane residual gas 6 into the second separation membrane permeate gas 7 that passes through the second separation membrane 103 and is relatively rich in carbon dioxide and a second separation membrane residual gas 8 that does not pass through the second separation membrane 103 and contains high purity methane.

The second separation membrane residual gas 8 contains high purity methane with the methane content of 97% or more. In this instance, the second separation membrane residual gas 8 may be fed and stored in a methane storage tank, and since methane is dominant in a first recovery separation membrane residual gas 19, the first recovery separation membrane residual gas 19 may be stored together with the second separation membrane residual gas 8.

The second separation membrane permeate gas 7 may be circulated to the first compressor 101 to recover methane and carbon dioxide in the second separation membrane permeate gas 7. In this instance, since it is desirable to recover the third separation membrane residual gas 10 as well, the second separation membrane permeate gas 7 and the third separation membrane residual gas 10 may be mixed together and circulated to the first compressor 101.

The third separation membrane 104 is supplied with a third separation membrane feed gas, and separates the third separation membrane feed gas into a third separation membrane permeate gas 9 that passes through the third separation membrane 104 and is relatively rich in carbon dioxide and the third separation membrane residual gas 10 that does not pass through the third separation membrane 104 and is relatively rich in methane.

The third separation membrane feed gas may be the first separation membrane permeate gas 5 or a mixed gas of the first separation membrane permeate gas 5 and at least one gas of the first recovery separation membrane permeate gas 18 or the second recovery separation membrane permeate gas.

The third separation membrane residual gas 10 may be circulated to the first compressor 101 to recover methane and carbon dioxide in the third separation membrane residual gas 10. In this instance, as described above, the third separation membrane residual gas 10 and the second separation membrane permeate gas 7 may be mixed together and circulated to the first compressor 101.

A vacuum pump 105 may be additionally installed on the outlet line of the third separation membrane permeate gas 9 to improve the separation efficiency.

The second compressor 106 compresses a second compressor feed gas 11. More specifically, the second compressor 106 compresses the second compressor feed gas 11 to the required pressure for the subsequent liquefaction process, for example, 20 to 50 bar, preferably 21 to 31 bar.

The second compressor feed gas 11 may be the second separation membrane permeate gas 9 or a mixed gas of the second separation membrane permeate gas 9 and at least one gas of the first recovery separation membrane permeate gas 18 or the second recovery separation membrane permeate gas.

In general, a compressor includes a cooler to remove water, and water in stream is removed using the cooler, but a small amount of water remaining in the liquefaction process may cause damage and failure of a device such as a meter when it gets frozen. To prevent this, the carbon dioxide capture apparatus combined with biogas upgrading of the present disclosure may further include a dryer to remove water from the liquefaction heat exchanger 108 feed gas. The water content in the gas stream having passed through the dryer may be, for example, about 50 ppm or less, preferably about 30 ppm or less, more preferably about 10 ppm or less, and most preferably substantially nearly zero.

The liquefaction heat exchanger 108 cools the liquefaction heat exchanger feed gas down to the suitable temperature for separation and purification and carbon dioxide liquefaction in the carbon dioxide purification unit 109, preferably −35 to −18° C. The refrigerant used in the liquefaction heat exchanger 108 may include Freon, nitrogen and propylene.

The liquefaction heat exchanger feed gas may be the gas 12 compressed by the second compressor or the gas stream free of water from the gas compressed by the second compressor using the dryer.

The carbon dioxide purification unit 109 includes a separation tower that is supplied with the gas 15 cooled by the liquefaction heat exchanger and performs separation and purification, and an upper part in which a carbon dioxide containing gas 16 is obtained and a lower part in which a high purity carbon dioxide liquid 17 is obtained through the separation and purification.

The number of stages or trays of the separation tower may be 6 to 10, and may change depending on the carbon dioxide purity and other process conditions, and packing rather than trays may be used.

The molar concentration of carbon dioxide in the high purity carbon dioxide liquid 17 recovered in the lower part of the separation tower may be 99% or more, and may be 99.9% or more according to the purpose of use of carbon dioxide.

The first recovery separation membrane 110 is supplied with the carbon dioxide containing gas 16 and separates the carbon dioxide containing gas 16 into the first recovery separation membrane permeate gas 18 that passes through the first recovery separation membrane 110 and is relatively rich in carbon dioxide and the first recovery separation membrane residual gas 19 that does not pass through the first recovery separation membrane 110 and includes high purity methane.

High purity carbon dioxide is recovered through the above-described separation membrane and separation tower process, but maximizing the recovery of carbon dioxide and methane in biogas is challenging. To address the challenge, the present disclosure additionally introduces a recovery separation membrane to separate and recover carbon dioxide and methane in the carbon dioxide containing gas 16 obtained in the upper part of the separation tower through the separation tower, in order to recover high purity carbon dioxide liquid and methane.

The present disclosure is characterized by feeding the carbon dioxide containing gas 16 obtained in the upper part of the separation tower after the carbon dioxide liquefaction process into the first recovery separation membrane 110 while keeping it in low temperature state, thereby remarkably improving the carbon dioxide and methane separation efficiency of the first recovery separation membrane 110. In addition, since there is no need for an additional compression or cooling process for increasing the separation efficiency, it is possible to remarkably improve the separation efficiency with minimum energy consumption.

More specifically, the temperature of the carbon dioxide containing gas 16 fed into the first recovery separation membrane 110 may be −40 to 0° C., preferably −35 to −18° C. In particular, when the temperature of the carbon dioxide containing gas 16 satisfies the above-described preferred range, it is preferred because it is possible to maintain the permeation rate at high level, thereby remarkably improving the selectivity without lowering the production amount, resulting in an increase in separation efficiency.

In the present disclosure, since the gas separation process through the separation membrane is performed through the solution-diffusion mechanism, the separation efficiency changes depending on carbon dioxide/methane selectivity (for example, $CO_2/CH_4$) of the separation membrane.

The first recovery separation membrane 110 may be made of at least one of polysulfone (PSF) or polyimide (PI). As shown in the following Tables 1 and 2, the polysulfone (PSF) or polyimide (PI) is preferred since carbon dioxide/methane selectivity and separation efficiency increases at low temperature. In contrast, the separation membrane of other material such as polyamide or polyether has an insignificant improvement in carbon dioxide selectivity at low temperature and thus is not suitable for the low temperature process.

TABLE 1

| Classification Temperature | PSF $CO_2/CH_4$ |
|---|---|
| −20° C. | 69.9 |
| −10° C. | 60.9 |
| 0° C. | 51.3 |
| 10° C. | 40.2 |
| 20° C. | 27.9 |

TABLE 2

| Classification Temperature | PI $CO_2/CH_4$ |
|---|---|
| −20° C. | 97.1 |
| −10° C. | 76.9 |
| 0° C. | 63.8 |
| 10° C. | 50.4 |
| 20° C. | 37.6 |

The first recovery separation membrane residual gas 19 is a high purity methane gas having high methane content and may be stored in the methane storage tank together with the second separation membrane residual gas 8.

The first recovery separation membrane permeate gas 18 may be circulated to the first separation membrane 102, the third separation membrane 104 or the second compressor 106, preferably the first separation membrane 102, in order to improve carbon dioxide recovery.

Figure 2:
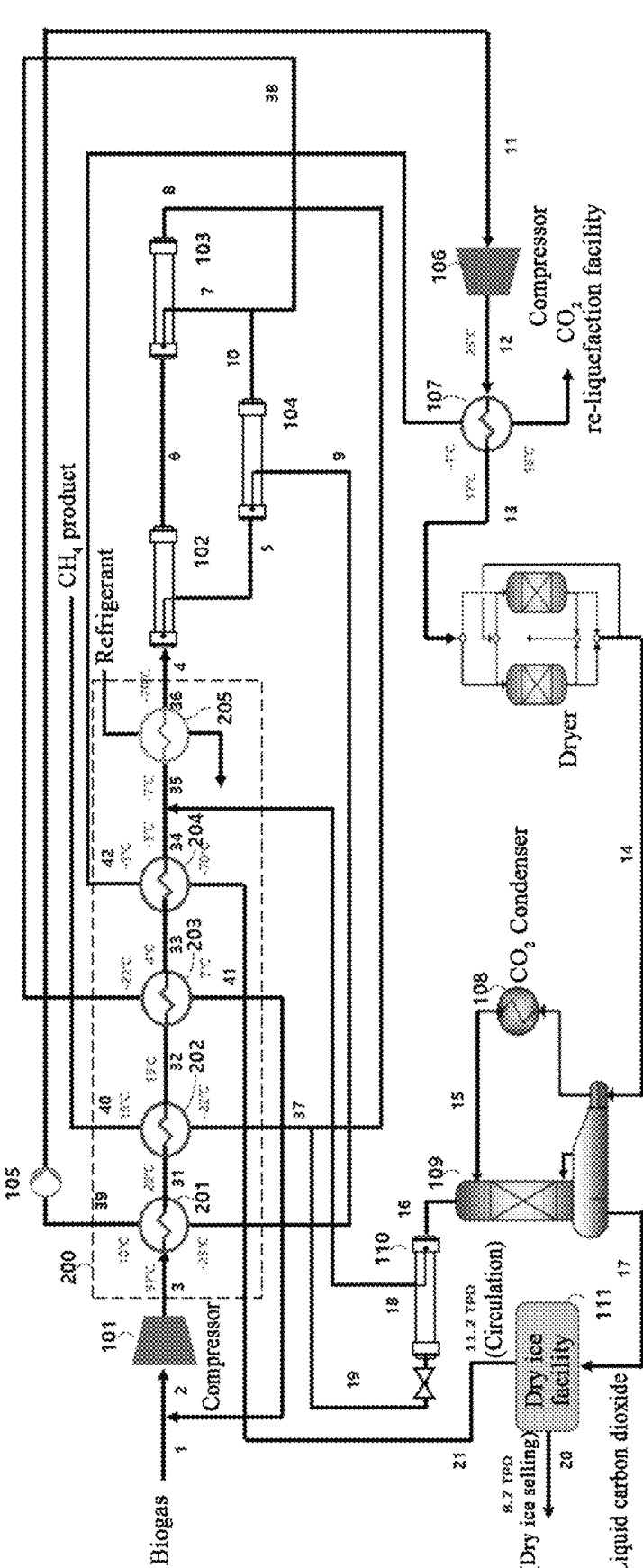
FIG. 2 is a procedure diagram for carbon dioxide capture combined with biogas upgrading, including a dry ice production unit and a heat exchanger network according to an embodiment of the present disclosure.

Although not shown in FIGS. 1 and 2, the carbon dioxide capture apparatus combined with biogas upgrading according to an embodiment of the present disclosure may further include a second recovery separation membrane that is supplied with the first recovery separation membrane residual gas 19 and separates the first recovery separation membrane residual gas 19 into the second recovery separation membrane permeate gas that is relatively rich in carbon dioxide, and a second recovery separation membrane residual gas that is relatively rich in methane. In this instance, the second recovery separation membrane residual gas including high purity methane may be stored in the methane storage tank, and the second recovery separation membrane permeate gas may be circulated to the first separation membrane 102, the third separation membrane 104 or the second compressor 106. The carbon dioxide capture apparatus combined with biogas upgrading of the present disclosure further including the second recovery separation membrane may maintain the carbon dioxide content in the recovered carbon dioxide stream and the methane content in the methane stream at high levels when the concentration of carbon dioxide fed into the first recovery separation membrane is low.

FIG. 2 is a procedure diagram for carbon dioxide capture combined with biogas upgrading, including a dry ice production unit and a heat exchanger network according to an embodiment of the present disclosure.

Referring to FIG. 2, the carbon dioxide capture apparatus combined with biogas upgrading according to another aspect of the present disclosure may further include the heat exchanger network 200.

Before feeding the gas 3 compressed by the first compressor into the first separation membrane 102, the heat exchanger network 200 cools down the gas 3 compressed by the first compressor by heat exchange with low temperature streams in the process and then feeds it into the first separation membrane 102. Through this, the separation process of the first separation membrane 102 may be performed at low temperature. In addition, since the gas obtained by the separation process of the first separation membrane 102 is also in low temperature state, the gas fed into the second separation membrane 103 and the third separation membrane 104 are also in low temperature state, and thus all the separation processes of the first separation membrane 102, the second separation membrane 103 and the third separation membrane 104 may be performed at low temperature.

That is, when the carbon dioxide capture apparatus combined with biogas upgrading of the present disclosure further includes the heat exchanger network 200, the gas fed into the first separation membrane 102, the second separation membrane 103 and the third separation membrane 104 is in low temperature state by heat exchange between low temperature streams in the process and the separation membrane feed gas. Accordingly, more preferably, the separation membrane is made of at least one of polysulfone (PSF) or polyimide (PI) to remarkably improve the carbon dioxide the separation efficiency. More specifically, the temperature of the gas fed into the first separation membrane 102, the second separation membrane 103 and the third separation membrane 104 may be −40 to 10° C., and most preferably −25 to −15° C.

That is, it is preferred that the first separation membrane 102, the second separation membrane 103 and the third separation membrane 104 are made of at least one of polysulfone (PSF) or polyimide (PI) since the methane and carbon dioxide separation efficiency remarkably increases when the separation process is performed at low temperature.

Before feeding the gas 3 compressed by the first compressor into the first separation membrane 102, the heat exchanger network 200 may cool down the gas 3 compressed by the first compressor by heat exchange with at least one of the second separation membrane permeate gas 7, the second separation membrane residual gas 8, the third separation membrane permeate gas 9, the third separation membrane residual gas 10, the carbon dioxide containing gas 16, the first recovery separation membrane permeate gas 18, the first recovery separation membrane residual gas 19 or the residual carbon dioxide gas 21, and preferably, the heat exchanger network 200 may cool down the gas 3 compressed by the first compressor by heat exchange with all the second separation membrane permeate gas 7, the second separation membrane residual gas 8, the third separation membrane permeate gas 9, the third separation membrane residual gas 10, the first recovery separation membrane residual gas 19 and the residual carbon dioxide gas 21.

According to a preferred embodiment of the present disclosure, the heat exchanger network 200 may include a first heat exchanger 201 to exchange heat between the gas 3 compressed by the first compressor and the third separation membrane permeate gas 9; a second heat exchanger 202 to exchange heat between the gas 31 compressed by the first compressor and cooled by the first heat exchanger and a methane dominated gas 37 including at least one of the second separation membrane residual gas 8 or the first recovery separation membrane residual gas 19; a third heat exchanger 203 to exchange heat between the gas 32 compressed by the first compressor and cooled by the second heat exchanger and a circulating gas 38 including at least one of the second separation membrane permeate gas 7 or the third separation membrane residual gas 10; and a fourth heat exchanger 204 to exchange heat between the gas 33 compressed by the first compressor and cooled by the third heat exchanger and the residual carbon dioxide gas 21. It was confirmed that when the heat exchanger network 200 includes the first to fourth heat exchangers, it is possible to cool without additional energy consumption down to the temperature for maximizing the carbon dioxide separation efficiency with minimum necessary energy.

The heat exchanger network 200 may further include a cooling heat exchanger 205 to additionally cool down the gas 3 compressed by the first compressor by heat exchange between the gas 3 compressed by the first compressor and the refrigerant, and in this instance, it may be possible to maximize the separation efficiency of carbon dioxide in the gas fed into the first separation membrane 102.

In this instance, the cooling heat exchanger 205 may use some of the increased capacity by increasing the refrigerant capacity of the liquefaction heat exchanger 108, and compared to the increased carbon dioxide separation efficiency of the separation membrane, very low energy consumption is used to increase the capacity of the liquefaction heat exchanger 108.

The gas 3 compressed by the first compressor may be fed into the cooling heat exchanger 205 immediately after compression, and may be fed after some part is cooled down by heat exchange through the heat exchanger network 200. Additionally, a mixed gas 35 of the gas 3 compressed by the first compressor and the first recovery separation membrane permeate gas 18 may be fed.

When the carbon dioxide capture apparatus combined with biogas upgrading of the present disclosure further includes the heat exchanger network 200, and the first recovery separation membrane permeate gas 18 is circulated to the first separation membrane 102, the gas fed into the first separation membrane 102 may be a mixed gas of the first recovery separation membrane permeate gas 18 and the gas 3 compressed by the first compressor then cooled by the heat exchanger network 200, a mixed gas of the gas 3 compressed by the first compressor and cooled in part by the heat exchanger network 200 and the first recovery separation membrane permeate gas 18 then further cooled by the heat exchanger network 200, or a mixed gas of the gas 3 compressed by the first compressor and cooled through the heat exchanger network 200 and the first recovery separation membrane permeate gas 18.

When the carbon dioxide capture apparatus combined with biogas upgrading of the present disclosure further includes the heat exchanger network 200, the separation efficiency of the first separation membrane 102 increases, and thus even though the first compressor 101 compresses to low pressure, sufficiently high separation efficiency may be achieved, and more specifically, when the carbon dioxide capture apparatus combined with biogas upgrading further includes the heat exchanger network 200, the first compressor may compress the first compressor feed gas 2 to the pressure of 2 to 15 bar, preferably 3.5 to 7.5 bar.

When the carbon dioxide capture apparatus combined with biogas upgrading of the present disclosure further includes the heat exchanger network 200, since the second separation membrane permeate gas 7 and the second separation membrane residual gas 8 are in low temperature state, at least one of the second separation membrane permeate gas 7 or the second separation membrane residual gas 8 may be fed into the heat exchanger network 200 to cool down the gas 3 compressed by the first compressor by heat exchange between them.

When the carbon dioxide capture apparatus combined with biogas upgrading of the present disclosure further includes the heat exchanger network 200, since the third separation membrane permeate gas 9 and the third separation membrane residual gas 10 are in low temperature state, at least one of the third separation membrane permeate gas 9 or the third separation membrane residual gas 10 may be fed into the heat exchanger network 200 to cool down the gas 3 compressed by the first compressor by heat exchange between them.

The carbon dioxide containing gas 16 is in low temperature state cooled by the liquefaction heat exchanger 108, and may be fed into the heat exchanger network 200 to cool down the gas 3 compressed by the first compressor by heat exchange between them.

According to an embodiment of the present disclosure, the carbon dioxide capture apparatus combined with biogas upgrading of the present disclosure may further include an additional heat exchanger 107 to cool down the gas 12 compressed by the second compressor by heat exchange between the gas 12 compressed by the second compressor and the residual carbon dioxide gas 21.

Since the residual carbon dioxide gas 21 has sufficiently low temperature of about −10 to 5° C. even after it is heated by the heat exchanger network 200, the residual carbon dioxide gas 21 fed into the additional heat exchanger 107 may be the one that has been heated by the heat exchanger network 200.

When the carbon dioxide capture apparatus combined with biogas upgrading of the present disclosure further includes the additional heat exchanger 107, the liquefaction heat exchanger feed gas may be the gas 13 cooled by the additional heat exchanger.

Since the first recovery separation membrane permeate gas 18 and the first recovery separation membrane residual gas 19 are in low temperature state cooled by the liquefaction heat exchanger 108, at least one of the first recovery separation membrane permeate gas 18 or the first recovery separation membrane residual gas 19 may be fed into the heat exchanger network 200 to cool down the gas 3 compressed by the first compressor by heat exchange between them.

When the present disclosure further includes the second recovery separation membrane, since the second recovery separation membrane permeate gas and the second recovery separation membrane residual gas maintain the low temperature streams cooled at the liquefaction heat exchanger 108, at least one of them may be fed into the heat exchanger network 200 for heat exchange with the gas 3 compressed by the first compressor.

Referring to FIG. 2 again, the carbon dioxide capture apparatus combined with biogas upgrading according to another aspect of the present disclosure may further include the dry ice production unit 111.

The dry ice production unit 111 includes a chamber in which the high purity carbon dioxide liquid 17 is received and converted to dry ice 20 and an outlet through which the residual carbon dioxide gas 21 not having been converted to the dry ice 20 in the high purity carbon dioxide liquid 17 exits. In this instance, the dry ice production unit 111 may be supplied with all the high purity carbon dioxide liquid 17 produced, but may be supplied with only a portion of the high purity carbon dioxide liquid 17 in some circumstances.

When the carbon dioxide capture apparatus combined with biogas upgrading according to the present disclosure further includes the dry ice production unit 111, it may be possible to improve the utilization of gaseous carbon dioxide lost in the process of producing the dry ice 20 from the high purity carbon dioxide liquid 17.

In the dry ice production unit 111, the high purity carbon dioxide liquid 17 is not completely converted to the dry ice 20, yielding the residual carbon dioxide gas 21. In this instance, since the temperature of the residual carbon dioxide gas 21 is very low temperature of −78 to −48° C., cold heat may be recovered through the heat exchanger network 200 to increase the separation efficiency of the separation membrane.

Since the residual carbon dioxide gas 21 is in very low temperature state, the residual carbon dioxide gas 21 has sufficiently low temperature of about −10 to 5° C. even after cold heat is recovered through the heat exchanger network 200, and thus may cool down the gas 12 compressed by the second compressor in the additional heat exchanger 107.

The residual carbon dioxide gas 21 may be fed into a carbon dioxide re-liquefaction facility after cold heat recovery.

Another aspect of the present disclosure provides a carbon dioxide capture process combined with biogas upgrading, including: a first compression step of compressing, by the first compressor, the first compressor feed gas including biogas; a first separation step of feeding the gas compressed by the first compressor into the first separation membrane to separate into the first separation membrane permeate gas and the first separation membrane residual gas; a second separation step of feeding the first separation membrane residual gas into the second separation membrane to separate into the second separation membrane permeate gas and the second separation membrane residual gas; a third separation step of feeding the first separation membrane permeate gas into the third separation membrane to separate into the third separation membrane permeate gas and the third separation membrane residual gas; a second compression step of compressing, by the second compressor, the second compressor feed gas including the third separation membrane permeate gas; a liquefaction step of cooling down, by the liquefaction heat exchanger, the gas compressed by the second compressor; a separation and purification step of feeding the gas cooled by the liquefaction heat exchanger into the separation tower to obtain the carbon dioxide containing gas in the upper part of the separation tower and recover the high purity carbon dioxide liquid in the lower part through the separation and purification process; and a first recovery step of feeding the carbon dioxide containing gas into the first recovery separation membrane to separate into the first recovery separation membrane permeate gas and the first recovery separation membrane residual gas, and circulating the first recovery separation membrane permeate gas to the first separation membrane, the third separation membrane or the second compressor.

Hereinafter, the carbon dioxide capture process combined with biogas upgrading will be described in detail, but some part of description that is determined to overlap the carbon dioxide capture apparatus combined with biogas upgrading is omitted.

The first compression step is the step of compressing, by the first compressor 101, the first compressor feed gas 2 including the biogas 1, and more specifically, compressing the first compressor feed gas 2 to the pressure of 5 to 20 bar, preferably 6 to 11 bar.

The first compressor feed gas 2 is a gas including the biogas 1, and may be the biogas 1 or a mixed gas of the biogas 1 and at least one gas of the second separation membrane permeate gas 7 or the third separation membrane residual gas 10.

The first separation step is the step of feeding the gas 3 compressed by the first compressor into the first separation membrane 102 to separate the gas 3 compressed by the first compressor into the first separation membrane permeate gas 5 that is relatively rich in carbon dioxide and the first separation membrane residual gas 6 that is relatively rich in methane.

The first separation membrane feed gas 4 may be the gas 3 compressed by the first compressor or a mixed gas of the gas 3 compressed by the first compressor and at least one gas of the first recovery separation membrane permeate gas 18 or the second recovery separation membrane permeate gas.

The second separation step is the step of feeding the first separation membrane residual gas 6 into the second separation membrane 103 to separate into the second separation membrane permeate gas 7 that is relatively rich in carbon dioxide and the second separation membrane residual gas 8 containing high purity methane for the purpose of methane enrichment and recovery.

The second separation membrane residual gas 8 contains high purity methane with the methane content of 97% or more. In this instance, the second separation membrane residual gas 8 may be fed and stored in the methane storage tank, and since methane is dominant in the first recovery separation membrane residual gas 19, the first recovery separation membrane residual gas 19 may be also stored together with the second separation membrane residual gas 8.

The second separation membrane permeate gas 7 may be circulated to the first compressor 101 to recover methane and carbon dioxide in the second separation membrane permeate gas 7. In this instance, since it is desirable to recover the third separation membrane residual gas 10 as well, the second separation membrane permeate gas 7 and the third separation membrane residual gas 10 may be mixed together and circulated to the first compressor 101.

The third separation step enables the feeding of the third separation membrane feed gas into the third separation membrane 104 to separate into the third separation membrane permeate gas 9 that is relatively rich in carbon dioxide and the third separation membrane residual gas 10 that is relatively rich in methane.

The third separation membrane feed gas may be the first separation membrane permeate gas 5 or a mixed gas of the first separation membrane permeate gas 5 and at least one gas of the first recovery separation membrane permeate gas 18 or the second recovery separation membrane permeate gas.

The third separation membrane residual gas 10 may be circulated to the first compressor 101 to recover methane and carbon dioxide in the third separation membrane residual gas 10.

The second compression step is the step of compressing, by the second compressor 106, the second compressor feed gas 11 to the required pressure for the liquefaction process, specifically 20 to 50 bar, preferably 21 to 31 bar.

The second compressor feed gas 11 may be the third separation membrane permeate gas 9 or a mixed gas of the third separation membrane permeate gas 9 and at least one of the first recovery separation membrane permeate gas 18 or the second recovery separation membrane permeate gas.

The liquefaction step enables the cooling of the liquefaction heat exchanger feed gas down to the suitable temperature for separation and purification and carbon dioxide liquefaction in the separation tower, preferably −35 to −18° C. The refrigerant used in the liquefaction heat exchanger 108 may include Freon, nitrogen and propylene.

The liquefaction heat exchanger feed gas may be the gas 12 compressed by the second compressor or the gas stream free of water from the gas compressed by the second compressor by the dryer.

The separation and purification step is the step of feeding the gas 15 cooled by the liquefaction heat exchanger into the separation tower to obtain the carbon dioxide containing gas 16 in the upper part of the separation tower, and recover the high purity carbon dioxide liquid 17 in the lower part of the separation tower through the separation and purification process.

The molar concentration of carbon dioxide in the high purity carbon dioxide liquid 17 may be 99% or more, and may be 99.9% or more according to the purpose of use of carbon dioxide.

The first recovery step is the step of feeding the carbon dioxide containing gas 16 into the first recovery separation membrane 110 to separate into the first recovery separation membrane permeate gas 18 and the first recovery separation membrane residual gas 19, and circulating the first recovery separation membrane permeate gas 18 to the first separation membrane 102, the third separation membrane 104 or the second compressor 106, preferably the first separation membrane 102, in order to recover carbon dioxide and methane.

The first recovery separation membrane residual gas 19 is a high purity methane gas and may be stored in the methane storage tank.

The first recovery step is characterized by feeding the carbon dioxide containing gas 16 into the first recovery separation membrane 110 while keeping it in low temperature state and separating it, thereby remarkably improving the carbon dioxide and methane separation efficiency of the first recovery separation membrane 110. In particular, since there is no need for an additional compression or cooling process for increasing the separation efficiency, it is possible to improve the carbon dioxide selectivity with minimum energy consumption, thereby remarkably improving the separation efficiency.

More specifically, the temperature of the carbon dioxide containing gas 16 fed into the first recovery separation membrane 110 may be −40 to 0° C., preferably −35 to −18° C.

The first recovery separation membrane 110 may be made of at least one of polysulfone (PSF) or polyimide (PI), and the polysulfone (PSF) or polyimide (PI) is preferred since the carbon dioxide/methane selectivity and the separation efficiency increases at low temperature.

According to an embodiment of the present disclosure, the process may further include a second recovery step of feeding the first recovery separation membrane residual gas 19 into the second recovery separation membrane to separate into the second recovery separation membrane permeate gas that is relatively rich in carbon dioxide and the second recovery separation membrane residual gas that is relatively rich in methane. In this instance, the second recovery separation membrane residual gas includes high purity methane and may be stored in the methane storage tank, and the second recovery separation membrane permeate gas may be fed into the first separation membrane 102, the third separation membrane 104 or the second compressor 106.

The carbon dioxide capture process combined with biogas upgrading of the present disclosure may further include, before feeding the gas 3 compressed by the first compressor into the first separation membrane, a heat exchange step of cooling down, by the heat exchanger network 200, the gas 3 compressed by the first compressor by heat exchange with at least one of the second separation membrane permeate gas 7, the second separation membrane residual gas 8, the third separation membrane permeate gas 9, the third separation membrane residual gas 10, the carbon dioxide containing gas 16, the first recovery separation membrane permeate gas 18, the first recovery separation membrane residual gas 19 or the residual carbon dioxide gas 21.

When the carbon dioxide capture process combined with biogas upgrading of the present disclosure further includes the heat exchange step, the gas fed into the first separation membrane 102, the second separation membrane 103 and the third separation membrane 104 are in low temperature state by heat exchange between the low temperature streams in the process and the separation membrane feed gas. More specifically, the temperature of the gas fed into the first separation membrane 102, the second separation membrane 103, and the third separation membrane 104 may be −40 to 10° C., and most preferably −25 to −15° C. Accordingly, more preferably, the first separation membrane 102, the second separation membrane 103 and the third separation membrane 104 are made of at least one of polysulfone (PSF) or polyimide (PI) to remarkably improve the carbon dioxide separation efficiency.

The heat exchange step may be the step of before feeding the gas 3 compressed by the first compressor into the first separation membrane 102, cooling down, by the heat exchanger network 200, the gas 3 compressed by the first compressor by heat exchange with at least one of the second separation membrane permeate gas 7, the second separation membrane residual gas 8, the third separation membrane permeate gas 9, the third separation membrane residual gas 10, the carbon dioxide containing gas 16, the first recovery separation membrane permeate gas 18, the first recovery separation membrane residual gas 19 or the residual carbon dioxide gas 21, and preferably, the heat exchange step may be the step of cooling down the gas 3 compressed by the first compressor by heat exchange with all the second separation membrane permeate gas 7, the second separation membrane residual gas 8, the third separation membrane permeate gas 9, the third separation membrane residual gas 10, the first recovery separation membrane residual gas 19 and the residual carbon dioxide gas 21.

More preferably, the heat exchange step may include the steps of: exchanging, by the first heat exchanger 201, heat between the gas 3 compressed by the first compressor and the third separation membrane permeate gas 9; exchanging, by the second heat exchanger 202, heat between the gas 31 compressed by the first compressor and cooled by the first heat exchanger and the methane dominated gas 37 including at least one of the second separation membrane residual gas 8 or the first recovery separation membrane residual gas 19; exchanging, by the third heat exchanger 203, heat between the gas 32 compressed by the first compressor and cooled by the second heat exchanger and the circulating gas 38 including at least one of the second separation membrane permeate gas 7 or the third separation membrane residual gas 10; and exchanging, by the fourth heat exchanger 204, heat between the gas 33 compressed by the first compressor and cooled by the third heat exchanger and the residual carbon dioxide gas 21.

The heat exchange step may further include the step of additionally cooling down, by the cooling heat exchanger 205, the gas 3 compressed by the first compressor by heat exchange between the gas 3 compressed by the first compressor and the refrigerant.

The cooling heat exchanger 205 may be supplied with the heat exchanger feed gas 35 in which the gas 3 compressed by the first compressor, the gas 34 compressed by the first compressor and cooled by the fourth heat exchanger or the gas 34 compressed by the first compressor and cooled by the fourth heat exchanger is additionally mixed with the first recovery separation membrane permeate gas 18.

When the carbon dioxide capture process combined with biogas upgrading of the present disclosure further includes the heat exchange step, the separation efficiency of the first separation membrane 102 in the first separation step increases, and thus even though the first compressor 101 compresses to low pressure, sufficiently high separation efficiency may be achieved, and more specifically, when the process further includes the heat exchange step, the first compression step may enable the compression of the first compressor feed gas 2 to the pressure of 2 to 15 bar, preferably 3.5 to 7.5 bar.

When the carbon dioxide capture process combined with biogas upgrading of the present disclosure further includes the heat exchange step, since the second separation membrane permeate gas 7 and the second separation membrane residual gas 8 are in low temperature state, at least one of the second separation membrane permeate gas 7 or the second separation membrane residual gas 8 may be fed into the heat exchanger network 200 in the heat exchange step to cool down the gas 3 compressed by the first compressor by heat exchange between them.

When the carbon dioxide capture process combined with biogas upgrading of the present disclosure further includes the heat exchange step, since the third separation membrane permeate gas 9 and the third separation membrane residual gas 10 are in low temperature state, at least one of the third separation membrane permeate gas 9 or the third separation membrane residual gas 10 may be fed into the heat exchanger network 200 in the heat exchange step to cool down the gas 3 compressed by the first compressor by heat exchange between them.

The carbon dioxide containing gas 16 is in low temperature state cooled by the liquefaction heat exchanger 108 and may be fed into the heat exchanger network 200 in the heat exchange step to cool down the gas 3 compressed by the first compressor by heat exchange between them.

According to an embodiment of the present disclosure, the process may further include an additional heat exchange step of cooling down, by the additional heat exchanger 107, the gas 12 compressed by the second compressor by heat exchange between the gas 12 compressed by the second compressor and the residual carbon dioxide gas 21.

The residual carbon dioxide gas 21 has sufficiently low temperature of about −10 to 5° C. even after it is heated by the heat exchanger network 200. Accordingly, the residual carbon dioxide gas 21 fed into the additional heat exchange 107 in the additional heat exchange step may be the one that has been heated through the heat exchanger network 200 in the heat exchange step.

When the carbon dioxide capture process combined with biogas upgrading of the present disclosure further includes the additional heat exchange step, the liquefaction heat exchanger feed gas may be the gas 13 cooled by the additional heat exchanger.

Since the first recovery separation membrane permeate gas 18 and the first recovery separation membrane residual gas 19 maintain low temperature streams cooled by the liquefaction heat exchanger 108, at least one of them may be fed into the heat exchanger network 200 in the heat exchange step for heat exchange with the gas 3 compressed by the first compressor.

When the present disclosure further includes the second recovery step, since the second recovery separation membrane permeate gas and the second recovery separation membrane residual gas maintain low temperature streams cooled by the liquefaction heat exchanger 108, at least one of them may be fed into the heat exchanger network 200 in the heat exchange step for heat exchange with the gas 3 compressed by the first compressor.

The carbon dioxide capture process combined with biogas upgrading of the present disclosure may further include a dry ice production step of converting the high purity carbon dioxide liquid 17 to the dry ice 20, and obtaining the residual carbon dioxide gas 21 not having been converted to the dry ice 20.

The dry ice production step is the step of converging the high purity carbon dioxide liquid 17 to the dry ice 20, and obtaining the residual carbon dioxide gas 21 not having been converted to dry ice.

The high purity carbon dioxide liquid 17 is not completely converted to the dry ice 20, yielding the residual carbon dioxide gas 21. In this instance, since the temperature of the residual carbon dioxide gas 21 is very low temperature of −78 to −48° C., cold heat may be recovered through the heat exchanger network 200 in the heat exchange step to increase the separation efficiency of the separation membrane.

Since the residual carbon dioxide gas 21 is in very low temperature state, the residual carbon dioxide gas 21 has sufficiently low temperature of about −10 to 5° C. even after cold heat is recovered through the heat exchanger network 200, and thus may cool down the gas 12 compressed by the second compressor in the additional heat exchange step.

Hereinafter, the present disclosure will be described in more detail through examples, but the scope and substance of the present disclosure should not be construed as being reduced or limited to the following examples.

Example 1

The process was designed as shown in FIG. 1 and performed for each stream as shown in the following Table 3, and the process results are shown in the following Table 5. In this instance, the first separation membrane 102, the second separation membrane 103, the third separation membrane 104 and the first recovery separation membrane 110 were made of polysulfone (PSF).

TABLE 3

| Stream# | Temperature (° C.) | Pressure (bar) | Composition (mol %) | | Flow rate (Nm³/h) |
|---|---|---|---|---|---|
| | | | CO₂ | CH₄ | |
| 1 | 25 | 1.3 | 40 | 60 | 1,080 |
| 2 | 25 | 1.3 | 40.9 | 59.1 | 1,835 |
| 3(4) | 25 | 9.5 | 40.9 | 59.1 | 1,835 |
| 5 | 25 | 1.3 | 77.5 | 22.5 | 677 |
| 6 | 25 | 9.5 | 80.5 | 19.5 | 1,158 |
| 7 | 25 | 1.3 | 58.7 | 41.3 | 521 |
| 8 | 25 | 9.5 | 1.7 | 98.3 | 637 |
| 9 | 25 | 0.1 | 94.9 | 5.1 | 444 |
| 10 | 25 | 1.3 | 44.6 | 55.4 | 233 |
| 38 | 25 | 1.3 | 42.3 | 57.7 | 755 |
| 11 | 25 | 1.1 | 94.9 | 5.1 | 497 |
| 12 | 25 | 24.4 | 94.9 | 5.1 | 497 |
| 15 | −33 | 23.2 | 94.9 | 5.1 | 497 |
| 16 | −33 | 21.0 | 67.3 | 32.7 | 77 |
| 17 | −16 | 22.7 | 99.9 | 0.1 | 420 |
| 18 | −46 | 1.1 | 95.0 | 5.0 | 54 |
| 19 | −33 | 21.0 | 2.5 | 97.5 | 23 |

Example 2

The process was designed as shown in FIG. 2 and performed for each stream as shown in the following Table 4, and the process results are shown in the following Table 5. In this instance, the first separation membrane 102, the second separation membrane 103, the third separation membrane 104 and the first recovery separation membrane 110 were made of polysulfone (PSF).

TABLE 4

| Stream# | Temperature (° C.) | Pressure (bar) | Composition (mol %) | | Flow rate (Nm³/h) |
|---|---|---|---|---|---|
| | | | CO₂ | CH₄ | |
| 1 | 25 | 1.3 | 40.0 | 60.0 | 1,080 |
| 2 | 25 | 1.3 | 37.2 | 62.8 | 1,773 |
| 3 | 37 | 6.5 | 37.2 | 62.8 | 1,773 |
| 31 | 28 | 6.5 | 37.2 | 62.8 | 1,773 |
| 32 | 15 | 6.5 | 37.2 | 62.8 | 1,773 |
| 33 | 4 | 6.5 | 37.2 | 62.8 | 1,773 |
| 34 | −5 | 6.5 | 37.2 | 62.8 | 1,773 |

TABLE 4-continued

| Stream# | Temperature (° C.) | Pressure (bar) | Composition (mol %) | | Flow rate (Nm³/h) |
|---|---|---|---|---|---|
| | | | CO₂ | CH₄ | |
| 35 | −7 | 6.5 | 39.1 | 60.9 | 1,844 |
| 36(4) | −20 | 6.5 | 39.1 | 60.9 | 1,844 |
| 5 | −22 | 1.3 | 81.7 | 18.3 | 737 |
| 6 | −20 | 6.5 | 10.7 | 89.3 | 1,107 |
| 7 | −22 | 1.3 | 23.5 | 76.5 | 465 |
| 8 | −20 | 6.5 | 1.5 | 98.5 | 642 |
| 9 | −23 | 0.8 | 95.1 | 4.9 | 509 |
| 10 | −22 | 1.3 | 52.1 | 47.9 | 228 |
| 11 | 25 | 1.1 | 95.1 | 4.9 | 509 |
| 12 | 25 | 24.4 | 95.1 | 4.9 | 509 |
| 13 | 17 | 24.1 | 95.1 | 4.9 | 509 |
| 14 | 17 | 23.9 | 95.1 | 4.9 | 509 |
| 15 | −30 | 23.2 | 95.1 | 4.9 | 509 |
| 16 | −30 | 21.0 | 71.5 | 28.5 | 87 |
| 17 | −17 | 22.7 | 99.9 | 0.1 | 422 |
| 18 | −39 | 6.5 | 86.5 | 13.5 | 70 |
| 19 | −30 | 21.0 | 7.5 | 92.5 | 17 |
| 20 | −78 | 1.0 | 99.9 | 0.1 | 238 |
| 21 | −78 | 1.7 | 99.9 | 0.1 | 184 |

TABLE 5

| Classification | Example 1 | Example 2 |
|---|---|---|
| CO₂ recovery (%) | 97.13 | 97.48 |
| CH₄ recovery (%) | 99.96 | 99.97 |
| Electricity consumption (kw) | 469 | 351 |

As shown in the above Table 5, it can be seen that the carbon dioxide capture apparatus and process combined with biogas upgrading according to the present disclosure may have the improved separation efficiency and recovery of methane and carbon dioxide, and remarkably reduce the electricity consumption when it further includes the heat exchanger network.

DETAILED DESCRIPTION OF MAIN ELEMENTS

101 First compressor
102 First separation membrane
103 Second separation membrane
104 Third separation membrane
105 Vacuum pump
106 Second compressor
107 Additional heat exchanger
108 Liquefaction heat exchanger
109 Carbon dioxide purification unit
110 First recovery separation membrane
111 Dry ice production unit
201 First heat exchanger
202 Second heat exchanger
203 Third heat exchanger
204 Fourth heat exchanger
205 Cooling heat exchanger
1 Biogas
2 First compressor feed gas
3 Gas compressed by first compressor
4 First separation membrane feed gas
5 First separation membrane permeate gas
6 First separation membrane residual gas
7 Second separation membrane permeate gas
8 Second separation membrane residual gas 9 Third separation membrane permeate gas
10 Third separation membrane residual gas
11 Second compressor feed gas
12 Gas compressed by second compressor
13 Gas cooled by additional heat exchanger
14 Gas dried by dryer
15 Gas cooled by liquefaction heat exchanger
16 Carbon dioxide containing gas
17 High purity carbon dioxide liquid
18 First recovery separation membrane permeate gas
19 First recovery separation membrane residual gas
20 Dry ice
21 Residual carbon dioxide gas
31 Gas compressed by first compressor and cooled by first heat exchanger
32 Gas compressed by first compressor and cooled by second heat exchanger
33 Gas compressed by first compressor and cooled by third heat exchanger
34 Gas compressed by first compressor and cooled by fourth heat exchanger
35 Additional heat exchanger feed gas
36 Gas compressed by first compressor and cooled by cooling heat exchanger
37 Methane dominated gas
38 Circulating gas
39 Gas heated by first heat exchanger
40 Gas heated by second heat exchanger
41 Gas heated by third heat exchanger
42 Gas heated by fourth heat exchanger

The invention claimed is:

1. A carbon dioxide capture apparatus combined with biogas upgrading, comprising:

a first compressor configured to compress a first compressor feed gas including biogas;

a first separation membrane configured to separate a first separation membrane feed gas including the gas compressed by the first compressor into a first separation membrane permeate gas and a first separation membrane residual gas;

a second separation membrane configured to receive the first separation membrane residual gas and separate into a second separation membrane permeate gas and a second separation membrane residual gas;

a third separation membrane configured to receive the first separation membrane permeate gas and separate into a third separation membrane permeate gas and a third separation membrane residual gas;

a second compressor configured to compress a second compressor feed gas including the third separation membrane permeate gas;

a liquefaction heat exchanger configured to cool down the gas compressed by the second compressor;

a carbon dioxide purification unit including a separation tower which is supplied with the gas cooled by the liquefaction heat exchanger, and an upper part in which a carbon dioxide containing gas is obtained and a lower part in which a high purity carbon dioxide liquid is obtained;

a first recovery separation membrane configured to receive the carbon dioxide containing gas and separate into a first recovery separation membrane permeate gas and a first recovery separation membrane residual gas; and a first circulation unit configured to circulate the first recovery separation membrane permeate gas to the first separation membrane, the third separation membrane or the second compressor.

2. The carbon dioxide capture apparatus combined with biogas upgrading according to claim 1, further comprising:
    a dry ice production unit including a chamber in which the high purity carbon dioxide liquid is received and converted to dry ice and an outlet through which a residual carbon dioxide gas not having been converted to the dry ice exits.

3. The carbon dioxide capture apparatus combined with biogas upgrading according to claim 1, further comprising:
    a heat exchanger network configured to cool down the gas compressed by the first compressor before feeding into the first separation membrane, by heat exchange with at least one of the second separation membrane permeate gas, the second separation membrane residual gas, the third separation membrane permeate gas, the third separation membrane residual gas, the carbon dioxide containing gas, the first recovery separation membrane permeate gas, the first recovery separation membrane residual gas or the residual carbon dioxide gas.

4. The carbon dioxide capture apparatus combined with biogas upgrading according to claim 3, wherein the heat exchanger network includes:
    a first heat exchanger to exchange heat between the gas compressed by the first compressor and the third separation membrane permeate gas;
    a second heat exchanger to exchange heat between the gas compressed by the first compressor and cooled by the first heat exchanger and a methane dominated gas including at least one of the second separation membrane residual gas or the first recovery separation membrane residual gas;
    a third heat exchanger to exchange heat between the gas compressed by the first compressor and cooled by the second heat exchanger and a circulating gas including at least one of the second separation membrane permeate gas or the third separation membrane residual gas; and
    a fourth heat exchanger to exchange heat between the gas compressed by the first compressor and cooled by the third heat exchanger and the residual carbon dioxide gas.

5. The carbon dioxide capture apparatus combined with biogas upgrading according to claim 1, wherein a temperature of the gas fed into the first separation membrane is-40 to 10° C.

6. The carbon dioxide capture apparatus combined with biogas upgrading according to claim 1, wherein a temperature of the gas fed into the first recovery separation membrane is-40 to 0° C.

7. The carbon dioxide capture apparatus combined with biogas upgrading according to claim 1, wherein the first separation membrane, the second separation membrane, the third separation membrane and the first recovery separation membrane are identical or different from one another, and are made of at least one of polysulfone (PSF) or polyimide (PI).

8. The carbon dioxide capture apparatus combined with biogas upgrading according to claim 1, further comprising:
    an additional heat exchanger configured to cool the gas compressed by the second compressor by additional heat exchange between the gas compressed by the second compressor and the residual carbon dioxide gas.

9. A carbon dioxide capture process combined with biogas upgrading, comprising:
    a first compression step of compressing, by a first compressor, a first compressor feed gas including biogas;
    a first separation step of feeding the gas compressed by the first compressor into a first separation membrane to separate into a first separation membrane permeate gas and a first separation membrane residual gas;
    a second separation step of feeding the first separation membrane residual gas into a second separation membrane to separate into a second separation membrane permeate gas and a second separation membrane residual gas;
    a third separation step of feeding the first separation membrane permeate gas into a third separation membrane to separate into a third separation membrane permeate gas and a third separation membrane residual gas;
    a second compression step of compressing, by a second compressor, a second compressor feed gas including the third separation membrane permeate gas;
    a liquefaction step of cooling down, by a liquefaction heat exchanger, the gas compressed by the second compressor;
    a separation and purification step of feeding the gas cooled by the liquefaction heat exchanger into a separation tower to obtain a carbon dioxide containing gas in an upper part of the separation tower and recover a high purity carbon dioxide liquid in a lower part through a separation and purification process; and
    a first recovery step of feeding the carbon dioxide containing gas into a first recovery separation membrane to separate into a first recovery separation membrane permeate gas and a first recovery separation membrane residual gas, and circulating the first recovery separation membrane permeate gas to the first separation membrane, the third separation membrane or the second compressor.

10. The carbon dioxide capture process combined with biogas upgrading according to claim 9, further comprising:
    a dry ice production step of converting the high purity carbon dioxide liquid to dry ice, and obtaining a residual carbon dioxide gas not having been converted to the dry ice.

11. The carbon dioxide capture process combined with biogas upgrading according to claim 9, further comprising:
    a heat exchange step of cooling down the gas compressed by the first compressor before feeding into the first separation membrane by heat exchange with at least one of the second separation membrane permeate gas, the second separation membrane residual gas, the third separation membrane permeate gas, the third separation membrane residual gas, the carbon dioxide containing gas, the first recovery separation membrane permeate gas, the first recovery separation membrane residual gas or the residual carbon dioxide gas.

12. The carbon dioxide capture process combined with biogas upgrading according to claim 9, wherein the heat exchange step comprises:
    exchanging, by a first heat exchanger, heat between the gas compressed by the first compressor and the third separation membrane permeate gas;
    exchanging, by a second heat exchanger, heat between the gas compressed by the first compressor and cooled by the first heat exchanger and a methane dominated gas including at least one of the second separation membrane residual gas or the first recovery separation membrane residual gas;

exchanging, by a third heat exchanger, heat between the gas compressed by the first compressor and cooled by the second heat exchanger and a circulating gas including at least one of the second separation membrane permeate gas or the third separation membrane residual gas; and exchanging, by a fourth heat exchanger, heat between the gas compressed by the first compressor and cooled by the third heat exchanger and the residual carbon dioxide gas.

13. The carbon dioxide capture process combined with biogas upgrading according to claim 9, wherein a temperature of the gas fed into the first separation membrane is -40 to 10° C.

14. The carbon dioxide capture process combined with biogas upgrading according to claim 9, wherein a temperature of the gas fed into the first recovery separation membrane is −40 to 0° C.

15. The carbon dioxide capture process combined with biogas upgrading according to claim 9, wherein the first separation membrane, the second separation membrane, the third separation membrane and the first recovery separation membrane are identical or different from one another, and are made of at least one of polysulfone (PSF) or polyimide (PI).

* * * * *